June 30, 1925.  1,544,178

J. M. POWELL ET AL

MANUALLY PROPELLED VEHICLE

Filed Jan. 30, 1924

Patented June 30, 1925.

1,544,178

UNITED STATES PATENT OFFICE.

JOHN MILTON POWELL AND GEORGE BEMIES, OF FORT SMITH, ARKANSAS.

MANUALLY-PROPELLED VEHICLE.

Application filed January 30, 1924. Serial No. 689,527.

*To all whom it may concern:*

Be it known that we, JOHN MILTON POWELL and GEORGE BEMIES, citizens of the United States, residing at Fort Smith, in the county of Sebastian and State of Arkansas, have made a certain new and useful Invention in Manually-Propelled Vehicles, of which the following is a specification:

The invention has relation to children's express and coaster wagons and other vehicles, and to means for propelling the same by the occupant, having for an object certain improvements therein.

The invention consists in the novel construction and combinations of parts as hereinafter set forth.

Figure 1:
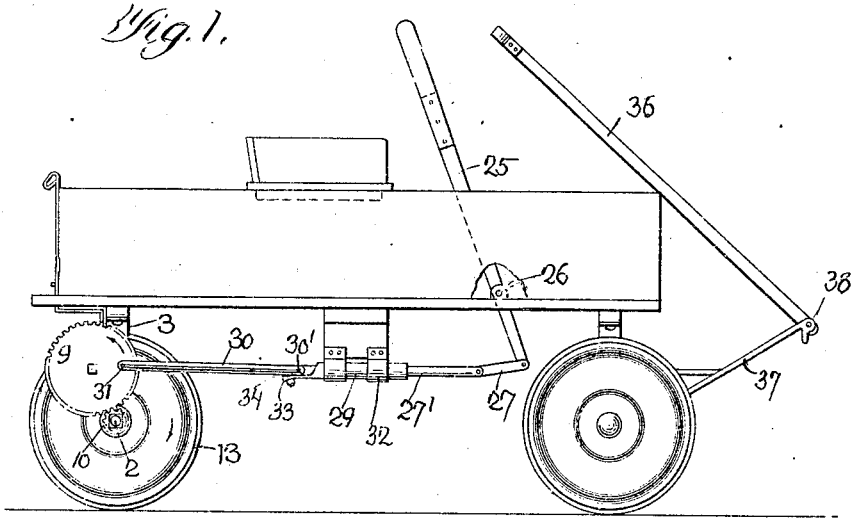
Figure 2:
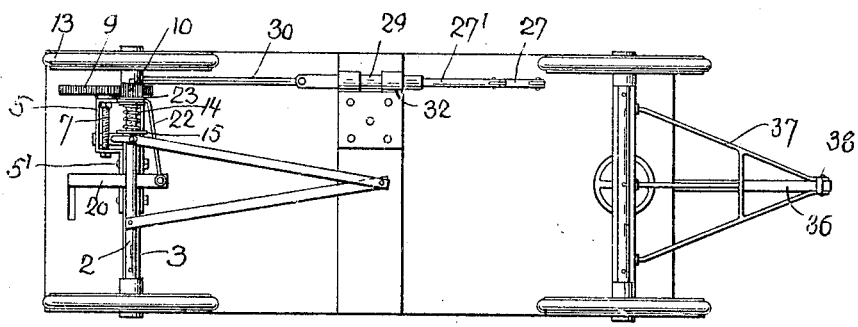
Figure 3:
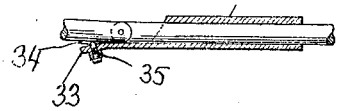

In the accompanying drawings illustrating the invention, Figure 1 is a side view of the invention as applied; Figure 2 is a bottom plan view of the same, and Figure 3 is a detail sectional view showing the sleeve and the spring pressed pin.

In these drawings, the numeral 1 designates the wagon body, 2 the rear axle, and 3, the rear bolster having a metal bracket 5 bolted thereto at 5′, and having parallel spaced branches wherein a pivot bolt 7 has bearings, said bolt carrying a spur gear wheel 9, meshing with a pinion 10 and having a clutch member adapted to be brought into clutch with a clutch member upon the hub of the rear wheel 13, a spring 14 surrounding the rear axle at one end and acting to normally press said pinion into clutch engagement with said rear wheel, said spring at one end bearing against the pinion and at the other end against a collar 15 of the rear axle.

When it is desired to use the wagon for hauling or for coasting, the pinion 10 is moved laterally out of mesh with the gear wheel 9 by means of a lever 20 having a link connection 22 with a collar 23 of said pinion, means being provided to hold said lever in position with the pinion out of clutch.

The vehicle is occupant propelled by a lever 25 located at one side of the body of the wagon out of the way and fulcrumed at 26 and provided with a forward pivotal link 27 having pivotal connection with a middle link 27′, the latter having slide bearings in a horizontal sleeve 29, said middle link having pivotal connection with a rear link 30, the latter having pivotal connection with a wrist pin 31 of the gear wheel 9.

The sleeve 29 is carried by a horizontal bracket 32 bolted to the bottom of the wagon body and serves to uphold the middle link and provide slide bearings therefor and also serves as a carrier for a means for preventing the stoppage of the rear link 30 on dead center, said sleeve having a rear downturned end portion or extension 33 carrying a spring pressed pin 34, bearing against the underside of the forward end of the rear link 30 with the spring 35 thereof under tension at the time that said rear link reaches dead center position, so that the pressure of the tensioned spring 35 will throw said link 30 past dead center, inasmuch as the forward pivot 30′ of the rear link will be at dead center position located forwardly of the spring pressed pin 34.

The steering and hauling pole 36 of the wagon is pivoted to the front hounds 37 and 38.

We claim:—

In gearing, a drive wheel, a driving device having a driving connection with said wheel including a forward link, a middle link, and a rear link, means for upholding said middle link and providing slide bearings therefor, including a horizontal sleeve, and a spring pressed pin carried by said sleeve and bearing against said rear link adjacent and in rear of its pivot to said middle link in dead center position and with the spring thereof tensioned to throw said rear link past dead center.

In testimony whereof we affix our signatures.

J. M. POWELL.
GEORGE BEMIES.

Witnesses:
HAVELL C. OSBORNE,
T. S. OSBORNE.